June 26, 1951  W. A. CLEMENTS  2,558,338
CERAMIC DRIER

Filed Nov. 17, 1947  4 Sheets-Sheet 1

INVENTOR:
WILLIAM A. CLEMENTS
BY
O. O. Martin
ATTORNEY

June 26, 1951  W. A. CLEMENTS  2,558,338
CERAMIC DRIER
Filed Nov. 17, 1947  4 Sheets-Sheet 2

INVENTOR:
WILLIAM A. CLEMENTS
BY
O. O. Martin.
ATTORNEY.

June 26, 1951     W. A. CLEMENTS     2,558,338
CERAMIC DRIER
Filed Nov. 17, 1947     4 Sheets-Sheet 3
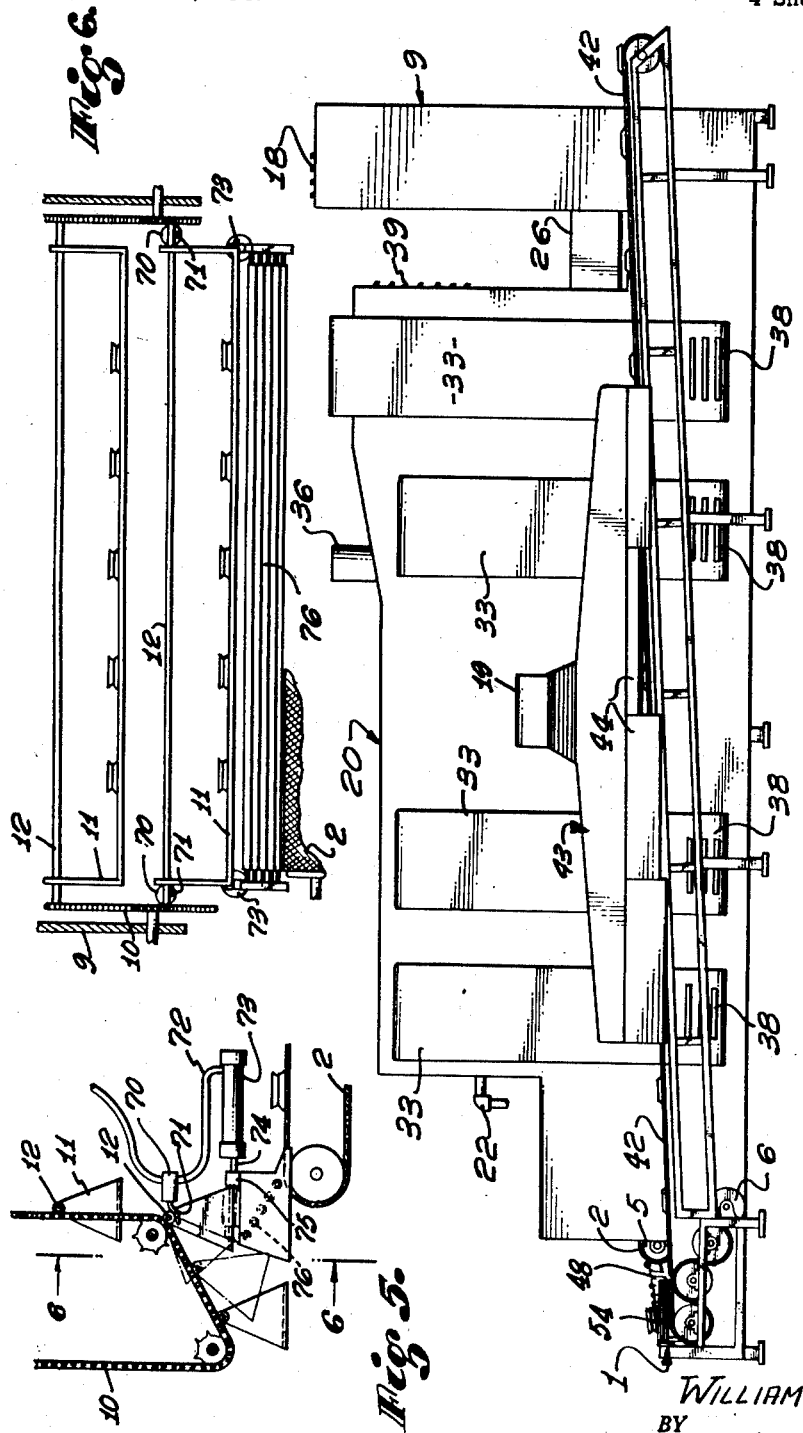
INVENTOR:
WILLIAM A. CLEMENTS
BY
O O Martin
ATTORNEY.

June 26, 1951 W. A. CLEMENTS 2,558,338
CERAMIC DRIER
Filed Nov. 17, 1947 4 Sheets-Sheet 4

INVENTOR:
WILLIAM A. CLEMENTS
BY
O. O. Martin
ATTORNEY.

Patented June 26, 1951

2,558,338

UNITED STATES PATENT OFFICE 2,558,338

CERAMIC DRIER

William A. Clements, Glendale, Calif.

Application November 17, 1947, Serial No. 786,449

12 Claims. (Cl. 263—8)

This invention relates to a device for effecting the initial drying and hardening of ceramic objects, such as plates, platters and saucers, which preliminary curing is necessary in order that the objects may safely be removed from their molds for further curing.

It is the general object of the invention to provide a device in which the time required for the initial drying is substantially reduced. It is a further object to provide a device in which the molds are returned for reuse after the dried articles have been removed therefrom. Another object is to remove from the molds the moisture absorbed from the ceramics while the molds are returned for reuse.

These and other objects of the invention and the many advantageous features thereof will be better understood from the following detailed description and by referring to the accompanying drawings, of which:

Fig. 3 is an elevational view of the opposite side of the machine;

Figs. 5 to 8, inclusive, are fragmentary views illustrating modified forms of operating mechanisms the importance of which is hereinafter fully described.

Figure 1:
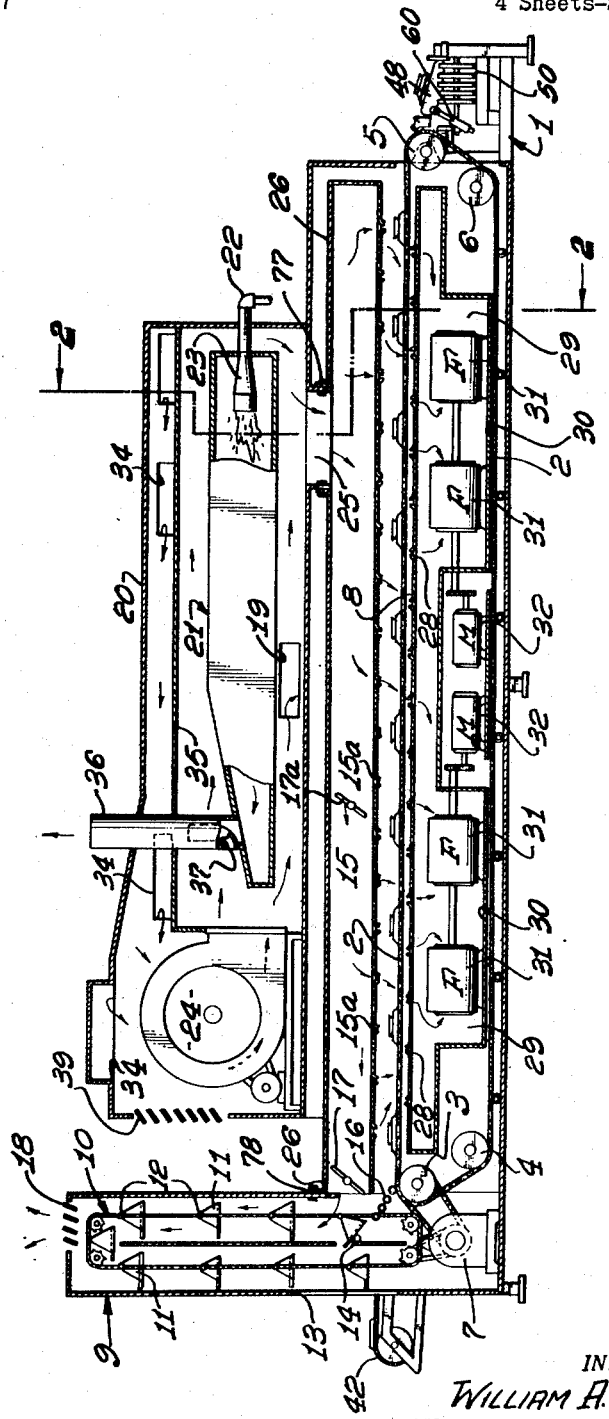
Fig. 1 is a side elevational view of a machine embodying the invention and with casing walls thereof broken away for the sake of clearness.

In a framing 1 is hung a conveyor belt 2 on rollers 3, 4, 5 and 6. This belt is by an electric motor 7 driven through a conventional speed reducing and varying unit at a speed of from three-fourths to four lineal feet per minute. The belt is preferably made from woven wire netting to permit free passage of air therethrough.

Within a casing 9, at the front end of the machine, is hung a vertically directed conveyor 10 including equidistant trays 11, which are pivotally hung on the chain of the conveyor by means of rods 12. This conveyor is suitably connected for rotation by the motor 7 in clockwise direction around a central partition of the casing in variable, timed relation to the movement of the main conveyor 2.

In modern ceramic practice molds A are used, over which slices of soft clay are evenly spread, shaped and then trimmed, whereupon the filled molds are placed on the trays 11 which slowly rise past the opening 13 of the casing 9. The trays rise to the top of the casing and are then returned downward until the upper front corner of the conveyor belt is reached, at which point they are automatically transferred to this belt to be carried therealong through the machine. Illustrative of simple means for transferring the molds A to the belt, I have shown a rod 14 transversely extending through the casing 9 and so positioned that the left corner of each tray will come in contact with this rod as the tray approaches the belt and at which point it is caused to swing sufficiently on its pivot to permit the filled molds to slide on to the belt. Riding thereon they are advanced through the machine between a plate 8 and a second plate 15, which plates are positioned a short distance below and above the upper reach of the belt. But I wish it understood that more elaborate tray tipping means may be employed. The transfer of the filled molds to the belt is facilitated by placing an inclined series of rollers 16 in the gap between the tilting tray and the end of the conveyor 2.

The framing 1 supports a housing 20, within which a smaller casing 21 is mounted and it is noticed that the latter extends the greater distance from one end of the housing 20 to the other. Fuel is admitted through a supply pipe 22 to a burner or other heat producing device 23 within the casing 21 for the purpose of heating the space therein as well as the walls thereof. An air circulating blower 24 is placed at the other end of the housing 20 to direct a current of air along and about the burner casing 21 and it is noticed that the air which becomes heated in its passage along the heated casing is directed through an opening 25 in the bottom of the housing 20 to the space above the upper conveyor plate 15. It is to be noted that a shallow tray 26 is fitted over this plate in order to provide an air chamber above the plate for carrying the air passing through the opening 25 through this air chamber to the upper reach of the conveyor belt 2. The plate 15 is for this purpose shown made throughout its length with equidistantly spaced transverse slits 15ᵃ forming jets through which the heated air is forced to descend at relatively high velocity to spread over the surface of the conveyor belt and the filled molds carried thereon and so to produce the condition of turbulence required for proper setting of the wet clay. The air then passes through similar slits 28 of the lower conveyor plate 8 into a closed chamber 29 which, by means of a shallow tray 30, is formed below the plate 8.

A plurality of air circulating fans 31 are mounted within the air chamber 29 and they are connected for operation by electric motors 32 in any suitable well known manner. These fans draw the air from the space through which the belt extends into the chamber 29 and direct this air through a conduit 33 (see Fig. 2), back to the upper portion of the space within the housing 20. It is now noticed that a partition 35, extending the greater portion of the horizontal distance through this housing, divides the latter into an upper space which may be termed the plenum chamber and a lower space hereinafter called the convection chamber. The air rising through the conduit 33 passes into the plenum chamber above the plate 35 through openings 34 to the fan 24, which recirculates a portion of the same air through the convection chamber and again past the heater casing 21. The combustion gases from the heating chamber are free to escape through suitable flues 36 into the atmosphere. The main reason for such recirculation is to increase the velocity of the air passing to the molded products, thereby better to control humidity, conserve heat and to create greater turbulence resulting in more even moisture removal.

As in all air circulating systems, conventional means is provided for controlling the fuel passing to the burner 23 but is not shown. Where not feasible to provide flues large enough to insure sufficient draft, a passage 37 for air from the blower 24 and extending upwardly within each flue, may be provided. The burner 23 may be replaced by a steam jet, or an electric heating element may be substituted.

In the handling of ceramic goods, it is important not only to control the temperature within the air passage through the dryer but also to control the humidity of the air, since the drying of the ware is a moisture removal process. Furthermore, it is essential to afford the wet clay products which have just been placed on the molds time for preliminary curing before they pass on to the conveyor belt 2. Such preliminary curing, which is termed mold release, takes place on the conveyor 10 within the vertical chamber 9. If the molded products were placed directly on to the conveyor 2, at the entrance to the space between the plates 8 and 15, no time for preliminary curing to release the molds from the forms would be provided and the product would be subject to cracking due to the sudden shrinkage of the exposed surface of the wet clay. It is common practice to use plaster of Paris molds in ceramic dryers. Such molds absorb moisture greedily and they extract the moisture from the adhering surface of the ceramics placed thereon before they are deposited on the main conveyor 2. The result is that the ceramic products become released from and cease to adhere to the molds and so are free gradually to shrink thereon as they advance through the machine.

In addition, it may be found advisable to open a passage from the space above the plate 15 into the casing 9 and to provide means, such as a shutter or damper 17, for controlling a small flow of air through this passage. As this air mingles with the air within the casing and rises above the mold carrying forms, it is found that a slight temperature rise is obtained and that the higher temperature furthers the drying process thereof. In order better to control this initial drying process, I have shown a shutter controlled vent 18 at the top of the casing. In addition, it may be advantageous to place a similar damper 17ᵃ a distance ahead of the damper 17 to provide better air control during the early stage of drying and higher velocity through the jets 15ᵃ in the later stages of drying by inducing increased turbulence.

In case it is found that the humidity within the space between the jet plates 8 and 15 reaches so great a degree of saturation that an insufficient amount of moisture is extracted from the product, it will be necessary to provide means for reducing the degree of humidity within this space. For the purpose of such humidity control, I have placed shutters 38 in the conduits 33 (see Fig. 2) through which some of the moisture carrying air from the fans 31 may be exhausted. When, in addition, shutters 39 are placed in the front wall of the upper casing 20 adjacent the circulating fan 24 and when any suitable conventional humidity control is placed within the machine and connected to operate these valves or shutters, it is found that perfect air conditions may be maintained.

The clay products are discharged in a manner which will be described presently from the belt 2 on to transverse conveyor belts 40, at which time the dried ceramic products are removed from the molds and by the atendants carried to stationary racks for further curing or processing. The molds are by the conveyor belts 40 transferred to a fourth conveyor belt 42 (see Figs. 3 and 7), which extends alongside of the machine back to a position adjacent the casing 9 of the vertical tray conveyor. The conveyor 42 is surrounded by a housing 43, from which a conduit 19 leads back to the convection chamber. This is done in order that some of the air circulated through the convection chamber may pass through this conduit and down on to the molds on the conveyor 42, thereby quickly to expel the moisture which may remain on the molds after the ceramic products have been removed therefrom. This is most essential in order that the molds may be in condition for immediate refilling when they are discharged from this conveyor. In order to check the condition of the returning molds, as they pass through the conveyor casing 43, it may be found advantageous to provide one or more shutters 44 along the outer surface thereof.

Before ceramic dryers of high speed were introduced, it required a period of from four to ten hours to effect the preliminary dry-curing of ceramics and this drying period is, in the present machine, reduced to from fifteen to thirty minutes. The effect of this time saving is not only tremendously to speed production but it also results in the saving of the number of molds required for each item to be dried, besides the saving of an enormous area of space for storing these molds.

Another great advantage of the type of dryer herein described is that any defect in the clay mixture itself will become apparent within the first fifteen or thirty minutes, as the cured ceramics leave the main conveyor of the dryer. Corrections in the clay mixtures may then quickly be made with comparatively little waste whereas, according to the old method of slow drying, such waste would not be discovered until great quantities had been stored for further curing.

The purpose of installing the vertical receiving conveyor 10 is merely to save floor space and this conveyor may be omitted in place where such saving is not of importance. Where this conveyor is omitted, it is merely required to extend the conveyor 2 for a distance sufficient to effect the preliminary curing of the product.

Figure 4:
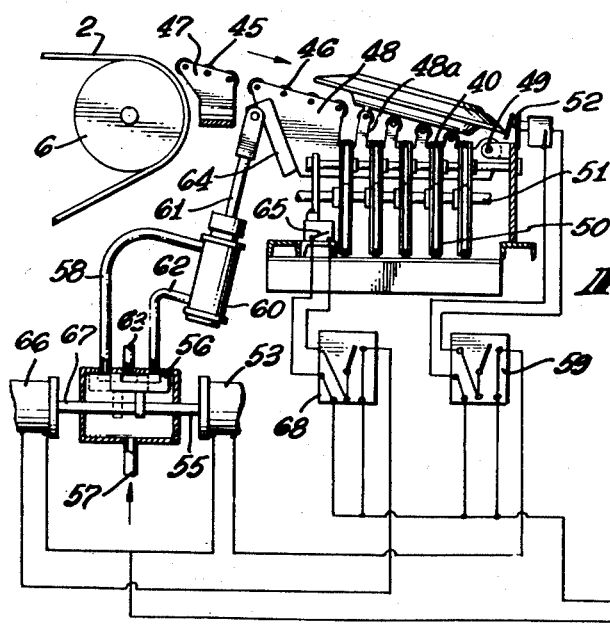
Fig. 4 is a fragmentary view of the right end of Fig. 1 showing driving connections which, for the sake of clearness, were omitted therefrom.
Figure 9:
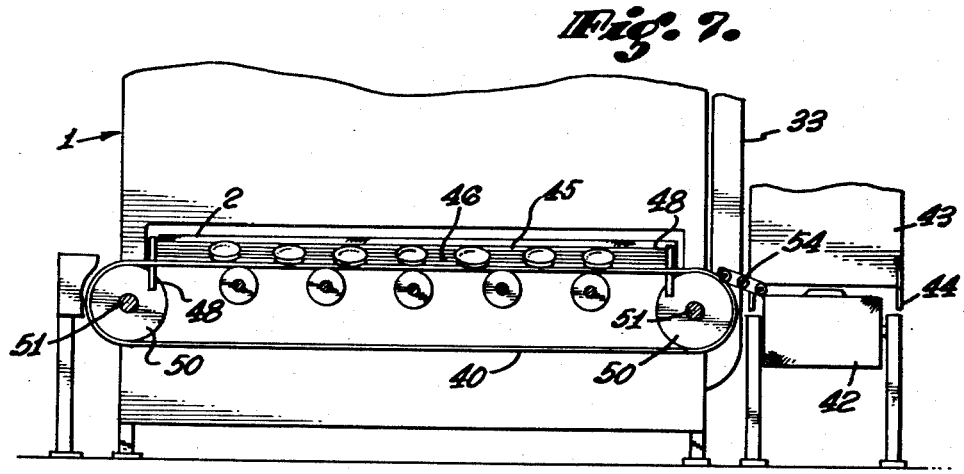

It was above stated that the main conveyor 2 travels at a very slow rate of speed and that the cured products are delivered from this conveyor to the conveyor 40. The mechanism employed to effect such transfer is in Figs. 4 and 7 shown to comprise two inclined series of rollers 45 and 46, all of which are freely rotatable in their supports. The rollers 45 are rotatable in a stationary frame 47, but the rollers 46 are hung in a frame 48 the forward end of which is pivotally supported at 49. The conveyor belts 40 are hung on pulleys 50 of horizontally supported shafts 51 and it is to be noted that the frame 48 is grooved, as indicated at 48ª, to clear the upper reaches of the belts 40.

Molds carrying ceramic objects are in Figs. 4 and 7 shown descending from the conveyor 2 along the inclined series of rollers 45 and 46. These descending objects have, as indicated in Fig. 4, reached a switch 52 which controls a circuit extending through a solenoid magnet 53, the plunger 55 of which is connected to draw a valve 56 into the position shown. A passage is thereby opened for pressure fluid from a suitable source (not shown) through a conduit 57, the space within the valve casing and a conduit 58 to the upper end of a cylinder 60 behind a piston which, by a rod 61, is pivotally connected to the inner end of the roller frame 48. The piston is forced downward through the cylinder causing the frame 48 to swing into horizontal position and so to deliver the load from the rollers 46 on to the conveyor belts 40 to be thereon carried to an inclined row of freely rotatable rollers 54 for delivery to the return conveyor 42. The fluid in front of the piston is free to pass through conduits 62 and 63 back to its source.

It was above stated that the trays 11 are manually loaded and that the rows of ceramic filled molds pass on to the conveyor 2 to be thereon carried through the machine. In passing from this conveyor on to the rollers 45 and 46, it may happen that the advance movement of some filled mold becomes slightly delayed and it becomes necessary for this reason slightly to delay the lowering of the frame 48 in order to make certain that all the filled molds have fully advanced. This may conveniently be done by placing a conventional time delay switch 59 in the circuit from the switch 52 to the solenoid 53. Such delay offers the added advantage that ample time is thereby provided for the operator to remove the objects from the molds before the empty molds pass to the return conveyor.

An insulated bar 64 of the frame 48 approaches and closes a switch 65 when the frame reaches horizontal position, thereby to energize a solenoid magnet 66, the plunger 67 of which also is connected to the valve 56, and so to return the valve to its initial position. The pressure fluid is then free to pass through the conduit 62 and to move the piston again to raise the frame 48 into its elevated position. In order, however, to afford the operators additional time to remove the ceramic objects from the molds and to perform such cleaning or adjusting operations as may be necessary and also to give the molds time to pass on to the conveyor 42, it is advisable slightly to delay this return elevating movement of the frame. To this end, a second time delay switch 68, of any commercially well known make, is placed in the circuit from the switch 65 to the solenoid 66. Since the ceramics move so slowly through the machine, substantial time delays are possible.

The simple manner of tipping the trays 11, illustrated in Fig. 1, was adopted merely for the sake of clearness. In actual practice I use pneumatic means for this purpose, substantially as illustrated in Figs. 5 and 6. As the trays 11 descend, it is found that the rods 12 depress the levers 71 of air valves 70 to cause air from a source of compressed air (not shown) to pass through conduits 72 to cylinders 73. A conventional piston within each cylinder is thereby advanced and the piston rods 74 are fitted with heads 75 engaging the front edge of the tray quickly to swing the latter on the rod 12. A spring within the cylinders returns the pistons to their initial position the moment the valve levers 71 are released. An inclined series of freely rotatable rollers 76 assist in guiding the filled forms from the trays to the conveyor 2.

It is seen from the foregoing description that means have been provided for controlling the air current and the humidity of the air within the spaces through which the ceramics filled form advance to the end that the initial drying may be effectively accomplished. In addition, it is also required to provide adjustment to suit ceramic objects of differing heights and this may be done by varying the height of the space between the plates 8 and 15. Illustrative of simple means of effecting such variations, I have shown the tray 26, carrying the plate 15, adjustably mounted in position at 77 and 78.

When the device of my invention is constructed in the manner above described it is found that ceramic objects of ordinary sizes, such as saucers and dinner plates, will quickly and perfectly undergo the necessary initial curing so that they may be transferred to racks for further curing without danger of warping or cracking. It is also found that sufficient moisture is removed from the molds during their return to the loading station properly to season them for immediate reuse. But while I have above described the manner in which the heating, air circulating and humidifying arrangements may be adjusted to suit various sizes of objects as well as atmospheric variations it may at times, where very large molds are used, become necessary to provide additional circulation creating and controlling devices for the returning molds.

Figure 8:
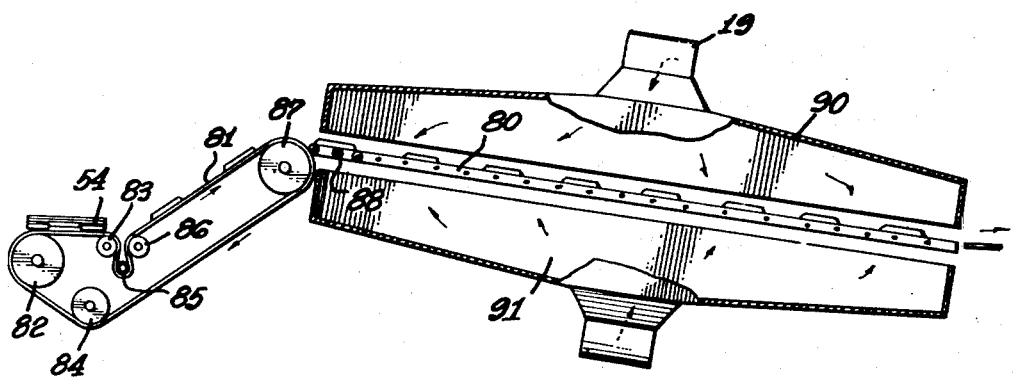

Such modified mold return assembly is, in Fig. 8, shown to comprise a frame 80 which is downwardly inclined toward the loading station in front of the vertical conveyor 10. A transfer belt 81 rides on pulleys 82, 83 to form a horizontal reach in proper position to receive the molds from the inclined rollers 54. Pulleys 84, 85 and 86 are provided to guide the belt in a rising plane to a pulley 87, from which the molds are delivered to a series of rollers 88 and the latter are hung for rotation in the frame 80. These rollers form a chute along which the molds move by gravity to the loading station. The slant of the chute is calculated to cause the molds to descend at a slightly higher rate of speed than that of the transfer conveyor 81, in order that molds always may be available for transfer to the receiving conveyor.

Figure 2:
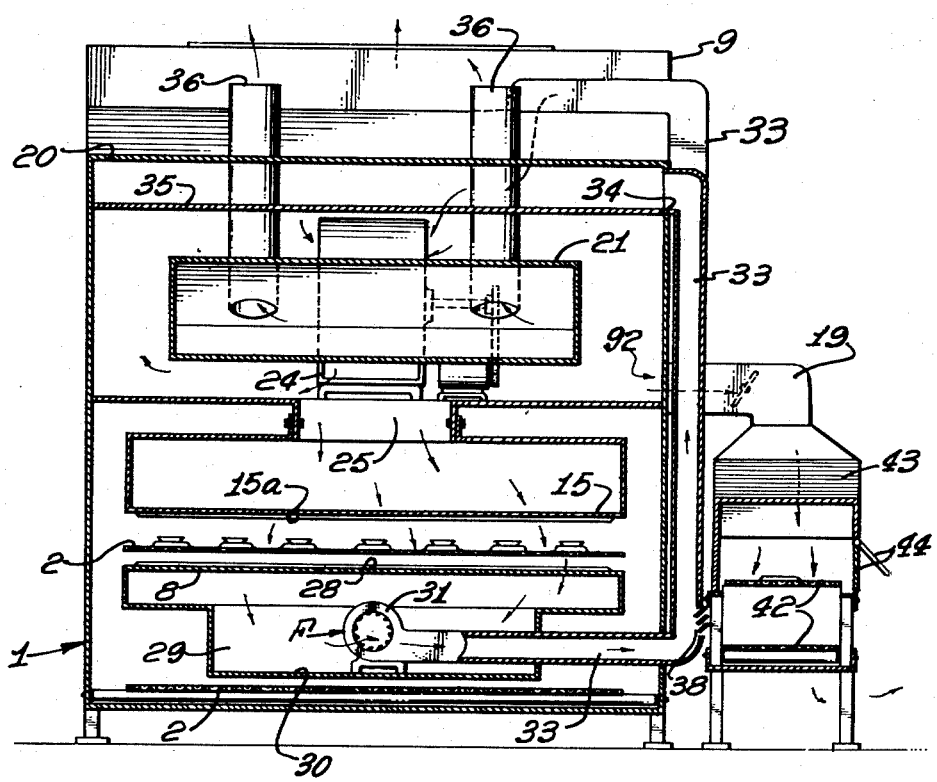
Fig. 2 is a sectional end view taken substantially on line 2—2 of Fig. 1.

A hood 90 is placed above the chute and this hood may be similar to the housing 43, communicating in like manner with the conduit 19 for the purposes above described. A casing 91 is placed below the chute, through which air from the fans 31, or any one of these fans, may be circulated. The air in this manner forced against the underside of the descending molds will drive sufficient moisture upward and out through the top of the molds to condition the latter for immediate reuse. If air from the fan 24 at the same time is passed through the conduit 19 down upon the descending molds, it is found the drying is effectively completed. It is well, however, to place a damper 92 within this conduit, as shown in Fig. 2, to check this airflow when found desirable, in which case it is possible to regulate the dampers 44 further to control the circulation through the casing 91.

I claim:

1. In a dryer for ceramic filled forms, in combination, a framing, a belt conveyor horizontally extending through said framing and adapted to receive said ceramic filled forms, means for slowly advancing said conveyor, means above the conveyor for circulating air therethrough thereby gradually to dry the ceramics on the conveyor, means for heating the air as it passes to the conveyor, means for returning the air from below the conveyor to said named circulating means, a second conveyor at the end of the first conveyor and transversely directed relative thereto for receiving the ceramic filled forms as they are discharged from the first conveyor for manual removal of the ceramics from the forms, a housing disposed alongside dryer framing, a third conveyor for receiving the forms deposited on the second conveyor and returning these forms through said housing to the entrance of the first named conveyor, and passages for conducting air from the dryer framing through said housing.

2. In a dryer adapted to receive ceramic filled forms in combination, a framing, a belt conveyor horizontally extending through said framing, means for slowly advancing said conveyor, means above the conveyor for circulating air therethrough thereby gradually to dry the ceramics on the conveyor, means for heating the air as it passes to the conveyor, means for returning the air from below the conveyor to said named circulating means, a second conveyor at the end of the first conveyor and transversely directed relative thereto for receiving the ceramic filled forms as they are discharged from the first conveyor for manual removal of the ceramics from the forms, a third conveyor for receiving the forms deposited on the second conveyor and returning these forms to the entrance of the first named conveyor, and a conduit from said air circulating means for carrying heated air to the returning forms.

3. In a dryer adapted to receive ceramic filled forms, in combination, a framing, a foraminous belt conveyor having one reach horizontally extending through said framing, means for slowly advancing said belt reach, means above said reach for circulating air therethrough thereby gradually to dry the ceramics on the conveyor belt, means for heating the air as it passes to the conveyor, means for returning the air from below the belt reach to said air circulating means, a second conveyor at the end of the first conveyor and transversely directed relative thereto for receiving the ceramic filled forms as they are discharged from the said belt reach for manual removal of the ceramics from the forms, means moving said transverse conveyor at relatively high speed, a housing disposed alongside the dryer framing, a third conveyor for receiving the forms deposited on the second conveyor movable through said housing and returning these forms to a position adjacent the entrance of the first named conveyor, and means for circulating air from said air-circulating means through the housing and back thereto.

4. In a dryer adapted to receive ceramic filled forms, in combination, a framing, a foraminous belt conveyor the upper reach of which extends horizontally through the dryer in position to receive the ceramic filled forms, means advancing the upper reach of the conveyor slowly through the machine, a housing above said upper conveyor reach, means for circulating air from said housing through the belt reach past the ceramic filled forms resting thereon, means for heating the air as it passes through the housing to the belt reach, a casing below the belt reach communicating with said housing, means within said casing for returning the air passing through the belt reach to the housing, a second conveyor at the end of said first named conveyor and transversely directed relative thereto for receiving the ceramic filled forms discharged from said belt reach, means moving said second conveyor at relatively high speed, means for transferring the forms from the belt reach to the second conveyor, a passage alongside the dryer framing communicating with the air-circulating spaces within the dryer framing to cause the air-circulating means to circulate heated air through this passage, and a third conveyor for returning the forms through said passage to a position adjacent the entrance to the conveyor reach after the ceramics have been manually removed therefrom.

5. In a dryer adapted to receive ceramic filled forms in combination, a framing, a foraminous belt conveyor the upper reach of which extends horizontally through the dryer in position to receive the ceramic filled forms, means advancing the upper reach of the conveyor slowly through the machine, a housing above said upper conveyor reach, means for circulating air from said housing through the belt reach past the ceramic filled forms resting thereon, a casing within said housing, a burner within said casing for heating the casing and by contact therewith the air as it passes through the housing to the belt reach, a casing below the belt reach communicating with said housing, means within said casing for circulating the air passing through the belt reach back to the housing, a second conveyor at the end of said first named conveyor and transversely directed relative thereto for receiving the ceramic filled forms discharged from the conveyor reach, means moving said second conveyor at relatively high speed, means for transferring the forms from the belt reach to the second conveyor, a third conveyor for returning the forms to a position adjacent the entrance to the first conveyor after the ceramics have been manually removed therefrom, a casing encompassing said third conveyor, and a conduit from the housing to said last named casing for carrying heated air to the forms carried thereon.

6. In a dryer adapted to receive ceramic filled forms, in combination, a framing, a foraminous belt conveyor the upper reach of which extends horizontally through the dryer and in position to receive the ceramic filled forms, means advancing the upper reach of the conveyor slowly through the machine, a housing above said upper conveyor reach, means within the housing for circulating air from the housing through the belt reach past the ceramic filled forms resting thereon, a casing within the housing, a burner within said casing for heating the walls thereof and by contact therewith the air as it passes through the housing to the belt reach, a casing below the belt reach, a conduit from said second casing to the said housing, means within said second casing for returning the air passing through the belt reach through said conduit back to the housing, a second belt conveyor at the end of said conveyor reach and transversely directed relative thereto for receiving the ceramic filled forms discharged from the conveyor reach, means moving said second conveyor at relatively high speed, means for transferring the forms from the first conveyor to the second conveyor, a third conveyor positioned to receive the forms from said second conveyor after the ceramics have been manually removed therefrom, and to return the forms to a position adjacent the entrance to the first conveyor, a conduit for distributing heated air from said housing over the returning forms, and means for controlling the flow through the housing.

7. In a dryer adapted to receive ceramic filled forms, a framing, a foraminous belt conveyor the upper reach of which extends horizontally through the framing a vertically directed conveyor within the framing having an endless series of equidistant trays pivotally hung therein in position to receive said ceramic filled forms, means for discharging the forms from the trays thereof on to the said belt reach, means for slowly moving both of said conveyors at relative predetermined speeds, means for circulating air down on to the ceramic filled forms through the upper reach of the conveyor, means for heating the air as it passes to the conveyor reach, a passage for the heated air to the vertical conveyor, control means for said passage, and means for returning the air after it has passed through the conveyor reach back to said air circulating means.

8. In a dryer adapted to receive ceramic filled forms, a framing, a belt conveyor the upper reach of which extends horizontally through the framing, a vertically directed conveyor having an endless series of equidistant trays pivotally hung thereon in position to receive said ceramic filled forms, means for discharging the forms from the trays thereof on to said conveyor reach, means for slowly moving both of said conveyors at relative predetermined speeds, a housing above said upper reach, means within said housing for circulating air through the upper reach past the ceramic filled forms advancing thereon, means within the housing for heating the air as it passes to the conveyor reach, a passage from said housing for heated air to the vertical conveyor, a damper controlling said passage, means for returning the air to the housing after it has passed through the conveyor reach, a second conveyor at the end thereof and transversely directed relative thereto, means transferring ceramic forms from the belt reach to said second conveyor, a tubular casing, a third conveyor extending through said casing for receiving the forms after the ceramics have been manually removed therefrom and returning the forms to a position adjacent said vertically directed conveyor, said tubular casing having an inlet for heated air from said air-circulating means and an outlet for return of the air to said housing, and means for controlling passage through said outlet.

9. In a dryer adapted to receive ceramic filled forms, a framing, a belt conveyor the upper reach of which extends horizontally through the framing, a vertically directed conveyor having an endless series of equidistant trays pivotally hung thereon to receive said ceramic filled forms, means for discharging the forms from the trays thereof on to said conveyor reach, means for slowly moving both of said conveyors at relative predetermined speeds, means for circulating air through the upper conveyor reach past the ceramic filled forms advancing thereon, means for heating the air as it passes to the conveyor, means below the conveyor reach for returning the air after it has passed therethrough to said air circulating means, a passage from the space above the conveyor reach to carry heated air to said vertically directed tray conveyor, and means for controlling the air flow through said passage.

10. In a dryer adapted to receive ceramic filled forms, a framing, a foraminous belt conveyor the upper reach of which extends horizontally through the framing, a vertically directed conveyor within a chamber of said framing adjacent said belt reach and having an endless series of equidistant trays pivotally hung thereon in position to receive said ceramic filled forms, means for tipping said trays as they approach the belt reach, means for receiving the forms from the trays and transferring the forms to said conveyor reach, means for slowly moving both of said conveyors at relative predetermined speeds, a housing above said belt reach, means within said housing for circulating air through tre reach past the ceramic filled forms advancing thereon, means within said housing for heating the air as it passes to the filled forms on the reach, a casing below the reach, means within said casing for returning the air after it has passed through the belt reach to said housing, means controlling the flow of air through the housing, a valve controlled passage for the air flow to said vertically directed conveyor, and a shutter controlled vent at the top of said vertical conveyor chamber.

11. In a dryer adapted to receive ceramic filled form, a framing, a foraminous belt conveyor the upper reach of which extends horizontally through the framing, a vertically directed conveyor at the beginning of said conveyor reach having an endless series of equidistant trays pivotally hung therein in position to receive said ceramic filled forms, a housing encompassing said tray conveyor, means for discharging the filled forms from the trays thereof on to said conveyor reach, means for slowly moving both of said conveyors at relative predetermined speeds, means for circulating air through said upper reach past the ceramic filled forms advancing thereon, means for heating the air as it passes over the filled forms through the conveyor reach, a casing below said reach, means within said casing for returning the air after it has passed through the conveyor reach to said air circulating means, a passage from said casing into said tray conveyor housing, means controlling air flow through said passage, and a shutter controlled vent in said housing at the top thereof.

12. In a dryer adapted to receive ceramic filled forms, a framing, a horizontal belt conveyor, the upper reach of which extends through said framing, a housing at the front end of said belt conveyor, a vertically directed partition within said housing, a conveyor having an endless series of equidistant trays pivotally hung thereon for upward movement along the front wall of said partition and adapted to receive said ceramic filled forms, means for tipping the trays descending along the rear surface of the partition as they approach said conveyor reach, and an inclinding series of rollers for receiving said filled forms from the tipping trays to transfer the forms from the tipping trays to transfer the forms to the upper conveyor reach, means for slowly moving both of said conveyors at relative predetermined speeds, means for circulating air through the upper reach past the ceramic filled forms advancing thereon, means for heating the air as it passes to the conveyor reach, means for controlling the passage thereto, means for returning the air after it has passed through the conveyor reach to said air circulating means, a passage for the circulating air to the space within the housing behind the partition thereof, controlled means for said passage, and a valve controlled vent at the top of the housing.

WILLIAM A. CLEMENTS.

REFERENCES CITED

The following references are of record in the file of this patent:

UNITED STATES PATENTS

| Number | Name | Date |
| --- | --- | --- |
| 687,033 | Kester | Nov. 19, 1901 |
| 923,092 | Valentine | May 25, 1909 |
| 1,246,515 | Young | Nov. 13, 1917 |
| 1,322,279 | Allson et al. | Nov. 18, 1919 |
| 1,369,411 | Edwards | Feb. 22, 1921 |
| 1,535,705 | Wilke | Apr. 28, 1925 |
| 1,559,199 | Straight | Oct. 27, 1925 |
| 1,888,573 | Sadwith | Nov. 22, 1932 |
| 1,915,648 | DeReamer | June 27, 1933 |
| 2,128,697 | Ettl | Aug. 30, 1938 |
| 2,274,426 | Miller | Feb. 24, 1942 |
| 2,274,842 | McCann | Mar. 3, 1942 |
| 2,360,661 | Eddy et al. | Oct. 17, 1944 |